(12) United States Patent
Tchernobrivets

(10) Patent No.: US 7,312,964 B2
(45) Date of Patent: Dec. 25, 2007

(54) GROUND-FAULT MONITOR FOR MULTIPLE CIRCUITS

(75) Inventor: Serguei Tchernobrivets, Richmond Hill (CA)

(73) Assignee: Tchernobrivets Serguei Borissovitch, Richmond Hill, Ontario (CA)

( * ) Notice: Subject to any disclaimer, the term of this patent is extended or adjusted under 35 U.S.C. 154(b) by 161 days.

(21) Appl. No.: 10/959,755

(22) Filed: Oct. 6, 2004

(65) Prior Publication Data

US 2005/0180069 A1 Aug. 18, 2005

Related U.S. Application Data

(60) Provisional application No. 60/544,959, filed on Feb. 17, 2004.

(51) Int. Cl.
*H02H 3/00* (2006.01)
(52) U.S. Cl. ...................................................... 361/42
(58) Field of Classification Search ................ 361/46, 361/42
See application file for complete search history.

(56) References Cited

U.S. PATENT DOCUMENTS

| | | | |
|---|---|---|---|
| 3,787,708 A | | 1/1974 | Hobson, Jr. |
| 3,818,282 A | * | 6/1974 | Buxton et al. ............... 361/627 |
| 3,869,649 A | * | 3/1975 | Hobson, Jr. ................... 361/46 |
| 3,911,323 A | | 10/1975 | Wilson et al. |
| 4,837,519 A | * | 6/1989 | Lopetrone et al. .......... 324/529 |
| 4,896,115 A | | 1/1990 | LeMaitre et al. |
| 5,515,218 A | * | 5/1996 | DeHaven ...................... 361/45 |
| 6,128,555 A | | 10/2000 | Hanson et al. |
| 6,195,243 B1 | * | 2/2001 | Spencer et al. ................ 361/64 |
| 6,246,556 B1 | | 6/2001 | Haun et al. |
| 6,473,281 B1 | * | 10/2002 | Kornblit ........................ 361/42 |
| 2002/0002593 A1 | * | 1/2002 | Ewing et al. ................ 709/212 |

FOREIGN PATENT DOCUMENTS

| | | |
|---|---|---|
| EP | 0 881 146 B1 | 5/1998 |
| EP | 0 890 836 A2 | 7/1998 |

OTHER PUBLICATIONS

National Semi Conductor, Jun. 1992, LM 1851 Ground Fault Interrupter.

* cited by examiner

*Primary Examiner*—Michael Sherry
*Assistant Examiner*—Scott Bauer

(57) ABSTRACT

A ground fault monitor for an electrical system having a plurality of branch circuits each having a respective ground conductor extending to a service panel that includes a ground connection to which the ground conductors are electrically connected. The ground fault monitor includes a current transformer for sensing current flow through the plurality of ground conductors to the ground connection and generating a current flow signal representative of any sensed current flow, and a monitoring circuit responsive to the current transformer for monitoring the current flow signal and generating an alarm when the current flow signal indicates the presence of a ground fault.

15 Claims, 3 Drawing Sheets

GROUND-FAULT MONITOR FOR MULTIPLE CIRCUITS

RELATED APPLICATIONS

This application claims priority to United States Provisional patent application No. 60/544,959 filed Feb. 17, 2004, which is hereby incorporated by reference.

FIELD OF THE INVENTION

The present invention relates to ground-fault monitoring and is particularly concerned with multiple circuit, ground-fault monitoring apparatus.

BACKGROUND OF THE INVENTION

Ground-faults can occur almost anywhere. Anytime a conductor is inserted between a hot wire or a neutral wire and the ground, a ground-fault can occur. A common cause of ground-faults is worn insulation on conductors with exposed wires, making them susceptible to finding a path to ground. Another common cause of ground-faults is loose or bad connections in electrical devices. In many cases, a ground fault does not result in a tripped circuit breaker or blown fuse, but exists undetected.

Various kinds of ground-fault interrupters are available. Ground-fault interrupters are designed to break the electrical circuit when a ground-fault is detected. A ground-fault interrupter measures the magnitude difference in current between the hot and neutral wires. In a normal operating situation, the ground-fault interrupter should be measuring zero difference.

U.S. Pat. No. 6,246,556 issued Jun. 12, 2001 describes an electrical fault detection system. This system detects ground-faults in a circuit being monitored. A ground-fault sensor is responsive to current flowing through hot and neutral sides of a circuit by producing an output signal to a ground-fault detector circuit.

Known ground-fault interrupters and monitoring devices are typically designed for use with a single circuit and are relatively expensive such that in residential application the use of ground fault interrupters are often limited to higher risk areas such as bathrooms. Thus, there is a need for a cost efficient and reliable ground fault monitoring system and method.

SUMMARY

According to one example of the invention is a ground fault monitor for an electrical system having a plurality of branch circuits each having a respective ground conductor extending to a service panel that includes a ground connection to which the ground conductors are electrically connected. The ground fault monitor includes a current transformer for sensing current flow through the plurality of ground conductors to the ground connection and generating a current flow signal representative of any sensed current flow, and a monitoring circuit responsive to the current transformer for monitoring the current flow signal and generating an alarm when the current flow signal indicates the presence of a ground fault.

According to another example of the invention is a ground fault monitoring system for an electrical system having a plurality of branch circuits each having a respective ground wire extending to a service panel. The system includes: a common bus located at the service panel to which the branch circuit ground wires are electrically connected; an intermediate conductor electrically connecting the common bus to a ground connection at the service panel; and a ground fault monitoring circuit including: (i) a current transformer for measuring current flow on the intermediate conductor; and (ii) a monitoring circuit responsive to the current transformer for generating an alarm signal when the measured current flow exceeds a threshold.

According to another example of the invention is a method for detecting a ground fault in an electrical circuit that includes a plurality of branch circuits each having a ground conductor connected to a common bus at a service panel, the common bus being connected by an intermediate conductor to ground. The method includes monitoring current flow on the intermediate conductor and generating a alarm signal when the current flow reaches a predetermined threshold that is indicative of a ground fault in any of the branch circuits.

BRIEF DESCRIPTION OF THE DRAWINGS

Example embodiments of the invention will be further understood from the following detailed description, with reference to the drawings, in which.

DETAILED DESCRIPTION

Figure 2:
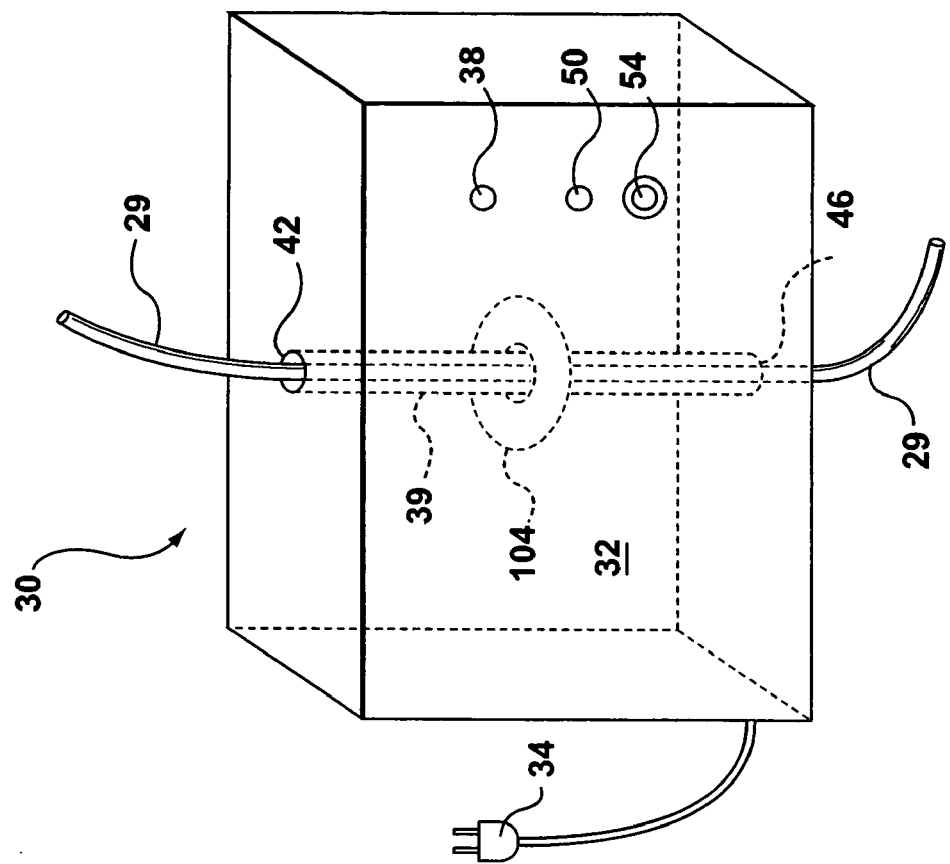
FIG. 2 is a perspective view of a ground-fault monitoring device according to an example embodiment of the present invention.

In the following description, similar features in the drawings have been given similar reference numerals.

Figure 1:
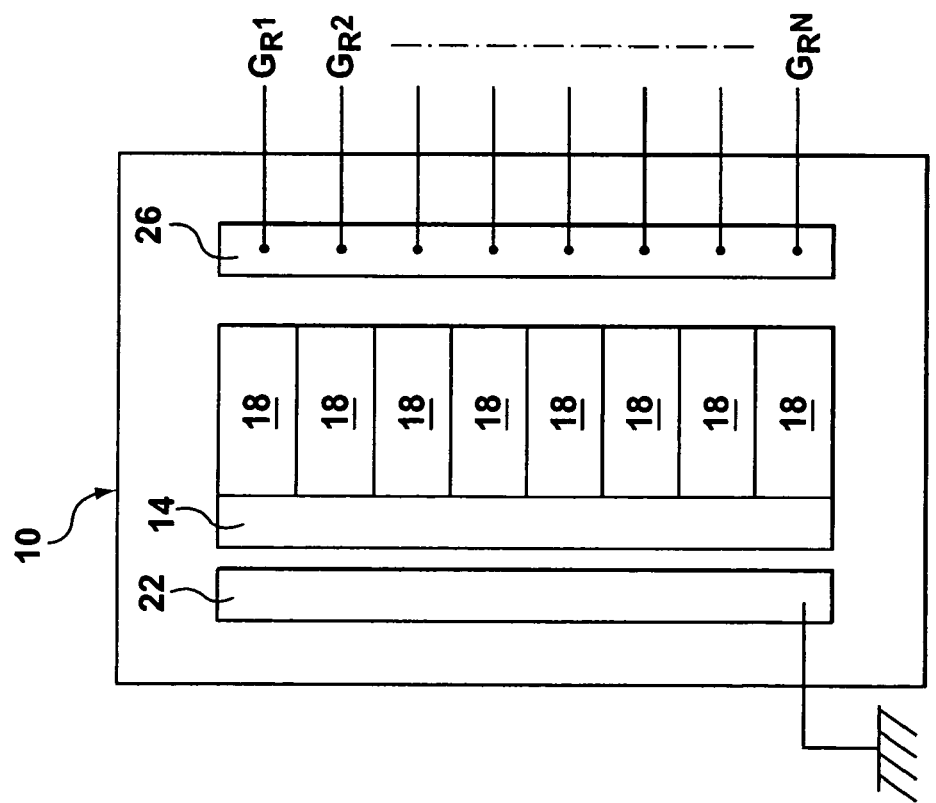
FIG. 1 is a diagrammatic illustration of an electrical service panel in accordance with an example embodiment of the invention.

FIG. 1 is a simplified diagrammatic illustration of an electrical service panel 10 that has been constructed in accordance with an example embodiment of the present invention. The service panel 10 may, among other things, be used in a residential unit and in the illustrated embodiment is a three-wire service panel.

The service panel 10 includes or is associated with a distribution center. Branch circuits for the residential unit are commonly connected to the distribution center. These branch circuits each include a hot line, a neutral line and a ground line $G_r^i$ (where $1<=i<=N$, where N=the number of branch circuits). In a 3-line service, two hot leads attach to a two-gain main circuit breaker (not shown in FIG. 1) that connects to two hot bus bars. The service panel includes a neutral bus bar 14. The neutral bus bar 14 electrically connects the incoming neutral service line with neutral leads of branch circuits. A plurality of branch circuit breakers 18 clip or slide onto the hot bus bars. These circuit breakers are rated to accept a fixed amperage of electricity. Each of the breakers 18 also connects with an outbound hot lead that supply a respective branch circuit.

The service panel 10 also includes a ground bus bar 22. The ground bus bar 22 and the neutral bus bar 14 are electrically connected together to provide a safe grounding path for both buses.

In a standard electrical service panel, all branch ground wires screw into the ground bus bar 22. In an example embodiment of the invention, however, the branch ground wires $G_r^1$-$G_r^N$ are screwed into or are otherwise connected to an additional bus bar 26 rather than to the conventional ground bus bar 22. The bus bar 26 is electrically isolated from the ground bus bar 22 of service panel 10 with the exception of an intermediate conductor, described below, that connects the bus bar 26 to the ground bus 22.

A ground-fault monitoring device 30 which in at least one example embodiment is used in combination with the service panel 10 is illustrated in FIG. 2. The device 30 may be located close to the service panel 10, possibly attached to the same wall where the service panel is installed. The device 30 includes a housing 32 which protects circuitry inside the device.

The device 30 can be powered by plugging it into a wall outlet. Plug 34 is provided for this purpose. In an alternative example embodiment, power is directly routed to the device 30 from the service panel 10. A green light emitting diode 38 is provided to indicate whether or not the device 30 is on or off.

The housing 32 of the device 30 includes openings 42, 46 that are connected by an internal passageway 39 that passes through an internal current transformer 104. An intermediate conductor 29 passes through passage 39 for electrically connecting the device to the service panel 10 as described in greater detail below.

On the exterior of the device 30 there is also a red light emitting diode 50 and an ON/OFF button 54. The diode 50 flashes when the device 30 detects current leakage (a ground-fault) above a certain threshold. The ON/OFF button 54 allows the device 30 to be turned on or turned off.

Figure 3:
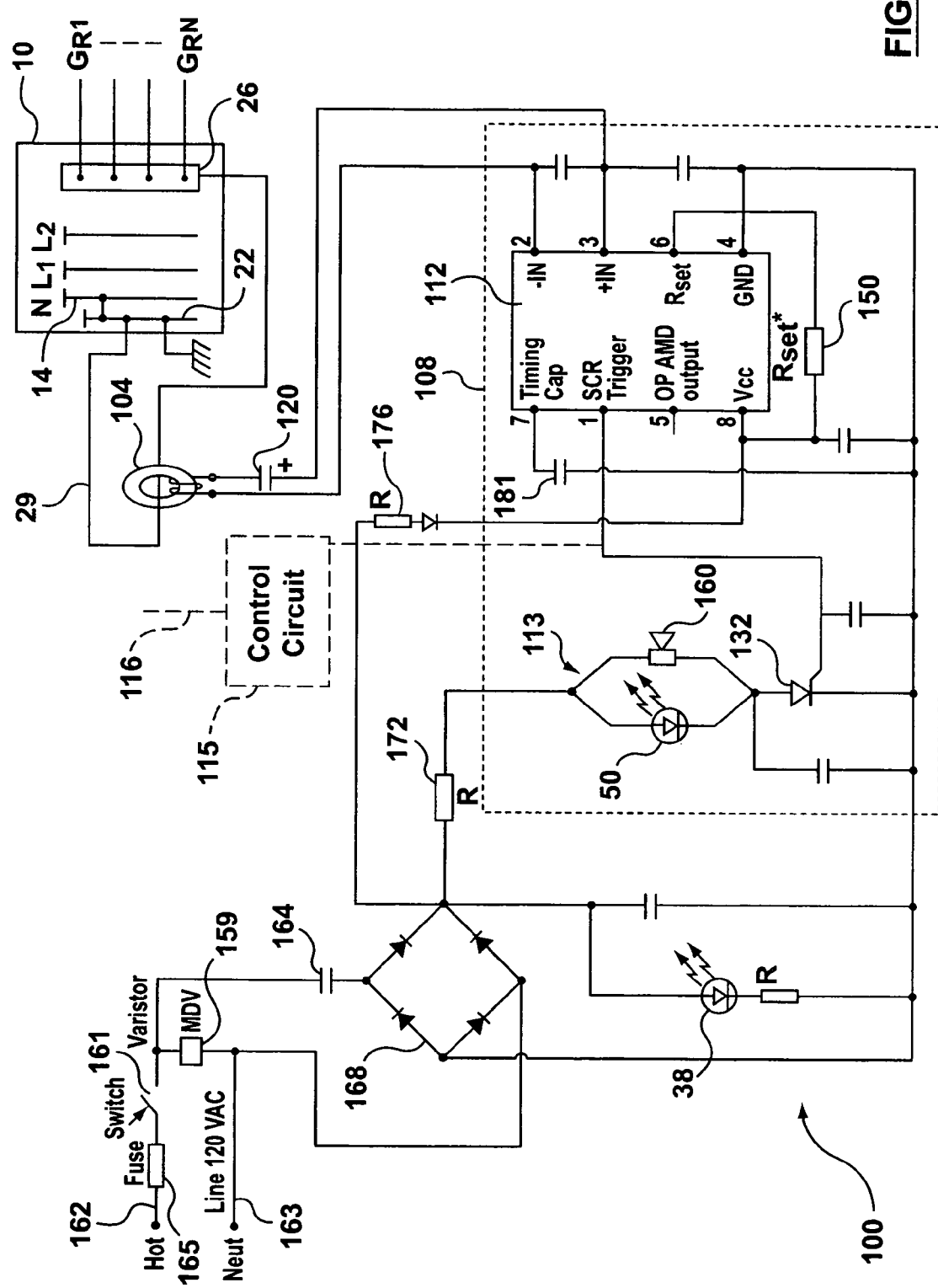
FIG. 3 is a circuit schematic diagram for the device of FIG. 2.

Circuitry 100 for the device 30, according to an example embodiment, is illustrated in FIG. 3. The circuitry 100 includes a current transformer 104, which may be a sense coil having a high winding ratio.

In an example embodiment, the intermediate conductor 29 connects the common bus 26 to the ground-connected bus 22 of the service panel 10, and the current transformer 104 is coupled to the intermediate conductor 29 for measuring current flow through it. More particularly, the intermediate conductor 29 extends from the common bus 26, through opening 42 of device housing 32, through the current transformer 104, out of the device housing 32 through opening 46, and to ground bus 22. The current transformer 104 extends around the intermediate conductor 29 inside the device housing 32.

Thus, the current transformer 104 produces a signal that is representative of any current along the intermediate conductor 29 between the common and ground bus bars 26 and 22. Because the branch ground wires $G_r^1$-$G_r^N$ of the branch circuits are commonly connected to the bus bar 26, the current transformer 104 is in communication with the branch ground wires through the bus bar 26 in that current flowing in any of the branch ground wires can act upon the current transformer 104 to generate a signal related to leakage current.

The monitoring circuitry 108 processes the signal produced by the current transformer 104. The processing means of the monitoring circuitry 108 includes an integrated circuit (IC) 112, which in an example embodiment is a LM 1851 Ground Fault Interrupter IC, for detecting if the current produced by the current transformer exceeds threshold conditions indicative of a ground fault. The IC 112 has eight pins including a timing capacitor pin (pin 7), a sense amplifier output pin (pin 5), a silicon controlled rectifier (SCR) trigger pin (pin 1), an inverting input pin (pin 2), and a non-inverting input pin (pin 3).

The signal from the current transformer 104 is fed into input pins 2 and 3 of the IC 112 through a capacitor 120. Capacitors are provided on the inputs to the IC 112 to obtain better noise immunity.

When the IC 112 receives signals on its input pins corresponding to a ground-fault, the IC 112 sends a ground-fault indication signal from pin 1 to an alarm circuit 113. The ground-fault indication signal (which is an SCR trigger signal) will cause an SCR 132 of the alarm circuit 113 to trigger (i.e. allow current flow through it). It will be understood that in alternative constructions of the ground-fault monitoring system of the present invention the ground-fault indication signal could be a signal entirely different than the signal from pin 1 of the IC 112.

Connected between pin 6 and the Vcc pin of the IC 112 is a resistor 150, which in some example embodiments may be a variable resistor. The value of the resistor 150 can be changed depending on the desired ground fault sensitivity. For example, in one example embodiment the magnitude of resistor 150 may be selected so that any sensed current flow through the intermediate conductor in excess of 5 mA results in an alarm driving signal being generated. In typical applications, the minimum leakage current for triggering an alarm condition will be between 5 mA and 15 mA, although values outside this range could also be used in some applications. The threshold circuit 112 is configured so that momentary spikes should not set off an alarm, and in this respect a desired integration time can be obtained through proper selection of a timing capacitor 181. Thus, the threshold current magnitude must be maintained for predetermined duration to result in an alarm triggering signal.

The alarm circuit 113 includes, in an example embodiment a visual alarm such as a flashing diode 50 and an audible alarm such as buzzer 160. The ground-fault indication signal from pin 1 of the IC 112 sets off the alarm circuit by triggering the SCR 132 to permit current flow through the diode 50 and buzzer 160. A person is alerted to a ground-fault by flashing of the diode 50 and noise generated by the buzzer 160. To turn off and reset the alarm ON/OFF button 54 (see FIG. 2) can be used. The ON/OFF button 54 opens or closes switch 161.

An MDV varistor 159 may be connected between hot wire 162 and neutral wire 163 which transmit power from the wall outlet, with fuse 165 protecting the circuitry 100. DC power to the circuit 100 is supplied by full-wave rectifier 168, and a resistor 176 acts as a voltage divider so that the power supplied at the Vcc pin of the IC 112 is in the appropriate voltage range.

During operation of the described embodiment of the ground default monitoring system, the current transformer 104 measures current flow through the intermediate conductor 29, which is effectively the sum of the current through all of the branch circuit ground wires $G_r^1$-$G_r^N$, and thus the ground fault monitoring device 30 simultaneously monitors the multiple branch circuits. When the current detected by current transformer 104 reaches a predetermined threshold that is indicative of a ground fault, the threshold circuit 112 generates an alarm driving signal, resulting in activation of audible buzzer 160 and visual alarm LED 50.

The device 30 can also aid in identifying the branch circuit that is responsible for the fault. A method for using the ground-fault monitoring device 30 to identify a faulty branch circuit once an alarm has been sounded is illustrated in the flow diagram of FIG. 4.

At step 400, an active alarm state is detected by a person who has heard and/or seen the ground fault alarm. That person may then call a electrician or repair person to perform the remaining steps, or in some situations may perform the remaining steps themselves. In step 402, a circuit breaker 18 for one of the branch circuits that is being monitored is turned off, and in step 404, the monitoring device 30 is turned off and then on via switch 161. In step 406, a determination is made if the device 30 is still generating alarm signals. If the alarm signals have stopped, then the branch circuit associated with the circuit breaker which was turned off in step 402 is likely the source of the ground fault and the faulty branch circuit is thus identified (step 410) for subsequent repair. If the alarm signal persists in step 406, then the branch circuit associated with the circuit breaker that was turned off in step 402 is likely not the source of the ground fault, and so it is turned back on and another circuit breaker selected (step 408), and the testing process repeated. Steps 402, 404, 406 and 408 are repeated for each monitored branch circuit until the faulty branch circuit is identified.

Figure 4:
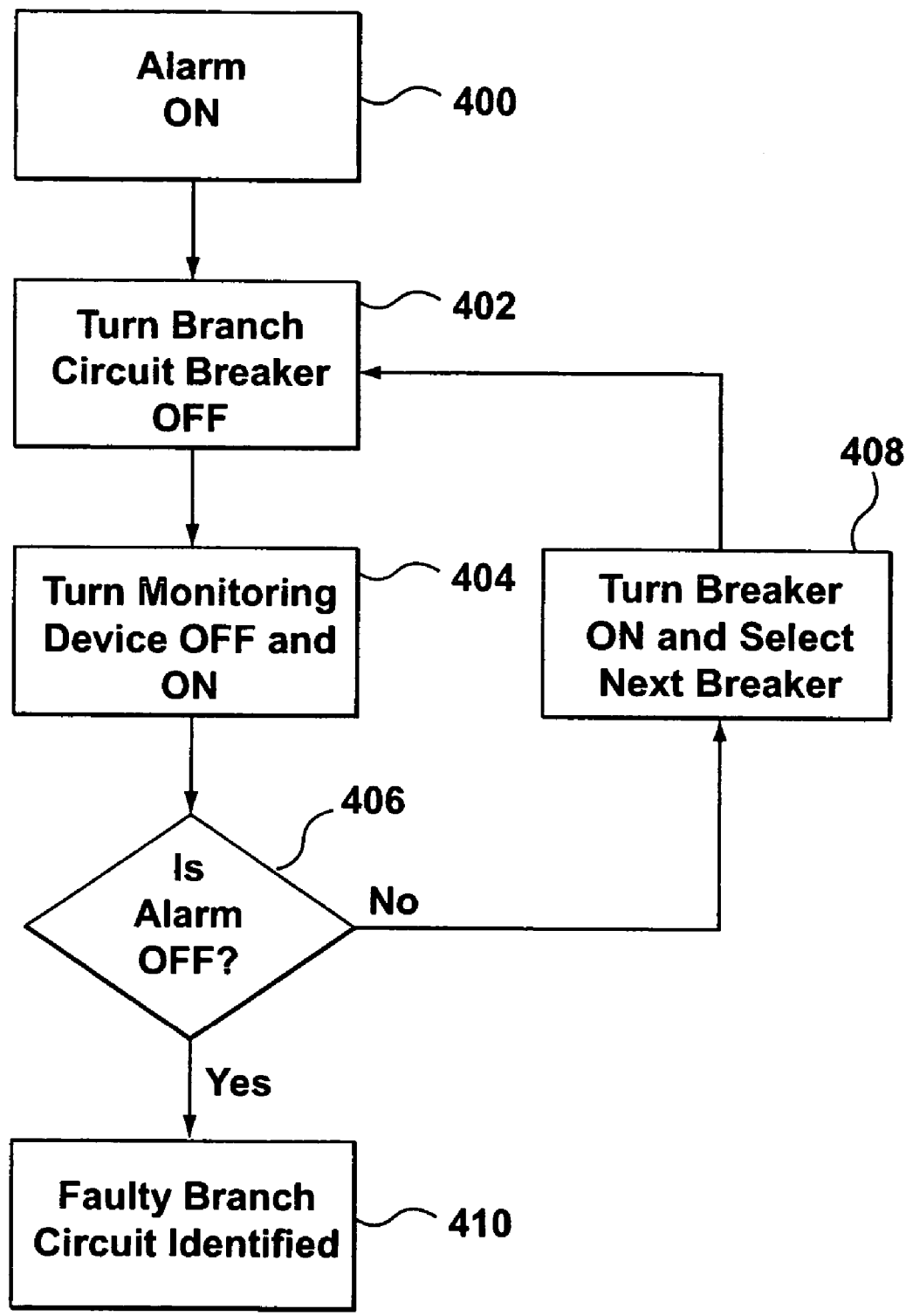
FIG. 4 is a flow diagram illustrating a method for using a ground-fault monitoring device according to an example embodiment of the invention.

In some example embodiments, parts or all of the process of FIG. 4 could be automated. For example, with reference again FIG. 3, the circuit 100 may include or be connected to a control circuit 115 responsive to the monitoring circuit 108 for sending signals via a modem over a communications link 116 to a remote monitoring location when an alarm condition is detected, allowing ground faults to be monitored at a remote location. Thus, ground faults could be monitored remotely in manner similar to which residential and commercial burglar and fire alarms are currently monitored, and in some embodiments could share a common modem system with such systems.

In some embodiments, the control circuit 115, which may include a microprocessor, could be connected to the service panel 10 and configured to automatically perform the method steps of FIG. 4 either upon receiving the alarm signal from monitoring circuit 108 or upon receiving instructions from the remote monitoring location. Upon identifying the faulty branch circuit, the control circuit could store, display and/or transmit to the remote location identification of the faulty circuit.

Thus, according to example embodiments of the invention, a single ground fault monitoring device 30 is used to monitor multiple branch circuits, thus providing a cost effective ground fault monitoring solution. If the number of circuits commonly connected to the distribution center of the electrical panel exceed a threshold (e.g. 25), it may in some applications be desirable to use another isolated common bus bar, and another current transformer attached to another intermediate conductor extending from the further common bus bar to the ground bus 22. Alternatively or additionally the resistor 150 (see FIG. 3) could be set to a higher resistance value.

Numerous modifications, variations and adaptations may be made to the particular embodiments of the invention described without the departing from the scope of the invention, which is defined in the claims.

What is claimed is:

1. A ground fault monitor for an electrical system having a plurality of branch circuits each having a respective ground conductor extending to a service panel that includes a ground connection to which the ground conductors are electrically connected, comprising:
    a first ground bus electrically insulated from the service panel, wherein the ground conductors are connected to the first ground bus;
    a second ground bus coupled to the ground connection;
    a current transformer for sensing current flow through the plurality of ground conductors to the ground connection and generating a current flow signal representative of any sensed current flow;
    an intermediate conductor extending from the first ground bus to the second ground bus wherein the current transformer senses current flow on the intermediate conductor; and
    a monitoring circuit responsive to the current transformer for monitoring the current flow signal and generating an alarm when the current flow signal indicates the presence of a ground fault.

2. The ground fault monitor of claim 1 wherein the monitoring circuit includes a threshold circuit for generating an alarm driving signal when the current flow signal exceeds a predetermined magnitude, and the monitoring circuit includes a visual alarm and an audible alarm for generating visual and audible alarms in response to the alarm driving signal.

3. The ground fault monitor of claim 1 including a control circuit responsive to the alarm generated by the monitoring circuit, the control circuit including communication means for sending a signal to a remote location if the monitoring circuit generates the alarm.

4. The ground fault monitor of claim 1 including a manual switch for stopping the alarm.

5. The ground fault monitor of claim 1 wherein the current transformer and the monitoring circuit are contained within a housing separate from the service panel, the housing having openings therein through which the intermediate conductor passes into and out of, a portion of the intermediate conductor inside the housing passing adjacent the current transformer.

6. A ground fault monitoring system for an electrical system having a plurality of branch circuits each having a respective ground wire extending to a service panel, the system comprising:
    a first ground bus located at the service panel to which the branch circuit ground wires are electrically connected, wherein the first ground bus is electrically isolated from the service panel;
    an intermediate conductor electrically connecting the first ground bus to a ground connection at the service panel;
    wherein the ground connection at the service panel includes a second ground bus to which a neutral bus at the service panel is electrically connected;
    a ground fault monitoring circuit including:
        (i) a current transformer for measuring current flow on the intermediate conductor; and
        (ii) a monitoring circuit responsive to the current transformer for generating an alarm signal when the measured current flow exceeds a threshold.

7. The ground fault monitoring system of claim 6 wherein the threshold is a predetermined current magnitude for a predetermined duration.

8. The ground fault monitoring system of claim 6 wherein the monitoring circuit includes an audio alarm and a visual alarm for generating audible and visual alarms, respectively, when the measured current flow exceeds the threshold.

9. The ground fault monitor of claim 8 including a manual switch for resetting the audio and visual alarms.

10. The ground fault monitor of claim 6 wherein the monitoring circuit includes a communications circuit for transmitting an alarm signal over a communications link to a remote location.

11. A method for detecting a ground fault in an electrical circuit that includes a plurality of branch circuits each having a ground conductor connected to a first ground bus at a service panel, wherein the first ground bus is electrically isolated from the service panel; the first ground bus being connected by an intermediate conductor to a ground connection at the service panel, wherein the ground connection at the service panel includes a second ground bus to which a neutral bus at the service panel is electrically connected, including:

monitoring current flow on the intermediate conductor and generating an alarm signal when the current flow reaches a predetermined threshold that is indicative of a ground fault in any of the branch circuits.

12. The method of claim 11 including, after an alarm signal has been generated, identifying which of the branch circuits has the ground fault by turning off each branch circuit individually until the alarm signal is no longer generated.

13. The method of claim 11 including transmitting notification of the alarm signal over a communications link to a remote location.

14. The method of claim 11 including generating a visual alarm and an audible alarm in response to the alarm signal.

15. The method of claim 14 wherein the visual alarm is a flashing light.

* * * * *